United States Patent [19]

Klauber et al.

[11] Patent Number: 5,626,427
[45] Date of Patent: May 6, 1997

[54] KEYBOARD WITH TRANSVERSE THUMB ACTIVATED CURSOR CONTROL

[75] Inventors: Robert D. Klauber; Steven W. Hathaway, both of Fairfield, Iowa

[73] Assignee: Keyboard Advancements, Inc., Fairfield, Iowa

[21] Appl. No.: 305,097

[22] Filed: Sep. 13, 1994

Related U.S. Application Data

[63] Continuation-in-part of Ser. No. 849,533, Mar. 11, 1992, Pat. No. 5,358,343, which is a continuation-in-part of Ser. No. 813,289, Dec. 19, 1991, abandoned, which is a continuation-in-part of Ser. No. 339,075, Apr. 14, 1989, Pat. No. 5,143,462.

[51] Int. Cl.$^6$ .................................................. B41J 5/28
[52] U.S. Cl. .................................... 400/486; 400/489
[58] Field of Search .................................... 400/485, 488, 400/489, 486, 473, 472, 697, 697.1, 310, 312; 341/20, 21, 22, 23, 34

[56] References Cited

U.S. PATENT DOCUMENTS

| | | | |
|---|---|---|---|
| 2,192,594 | 3/1940 | Brand et al. | 197/11 |
| 4,121,048 | 10/1978 | Choudhury | 400/485 |
| 4,522,518 | 6/1985 | Schmidt | 400/486 |
| 4,769,516 | 9/1988 | Allen | 400/485 |
| 4,795,349 | 1/1989 | Sprague et al. | 434/156 |
| 5,017,030 | 5/1991 | Crews | 400/485 |

FOREIGN PATENT DOCUMENTS

| | | | |
|---|---|---|---|
| 0081186 | 5/1983 | Japan | 400/472 |
| 0651504 | 9/1984 | Sweden | 400/472 |

OTHER PUBLICATIONS

"Compact Computer Keyboard", pp. 5640–5642. IBM Technical Disclosure Bulletin, vol. 27, No. 10A, Mar. 1985.
Apple Macintosh, Trackball, "A Peck of New Apple Macintashes," Byte, Nov. 1991, pp. 50–51.
Appoint, Thumbelina advertisement, "Selective Software", Fall 1991, p. 40.
Everex Systems, Inc., Product Review & Manual Section, supplied Feb. 21, 1992.
Everex Systems, Inc, "J" Key advertisement, PC Magazine, Feb. 25, 1992, p. 64.
ISO/IEC 9995-1&-2 "General Principles governing Keyboard layouts", International Organization for Standarization, R. Riess, Jun. 20, 1991.
Kensington Microwave Ltd, Mouse advertisement, "PC Magazine" Aug. 1991, p. 245.
Outbound Laptop System advertising brochure, Sep. 1991.
Zeos International Ltd, Keyboard advertisment, "PC Magazine", Aug. 1991, p. 197.
IBM Technical Disclosure Bulletins (vol. 26 No. 2 Jul. 1983 p. 736); (vol. 23, No. 8 Jan. 1981); (vol. 26 No. 7B Dec. 1983 p. 3746); (vol. 28 No. 5 Oct. 1985 p. 1859); (vol. 21 No. 8 Jan. 1979 p. 3261).

*Primary Examiner*—Edgar S. Burr
*Assistant Examiner*—Anthony H. Nguyen

[57] ABSTRACT

The invention comprises an ergonomic means for activation of cursor control keys on a computer or electronic typewriter keyboard by utilizing transverse pressure on the cursor control keys applied via the thumbs. The cursor control keys (26, 28, 60, 62) are positioned within comfortable reach of the thumbs such that activation may be done by a touch typist without looking at the keyboard, without uncomfortable stretching, and without moving an entire hand.

15 Claims, 3 Drawing Sheets

KEYBOARD WITH TRANSVERSE THUMB ACTIVATED CURSOR CONTROL

BACKGROUND OF THE INVENTION

This application is a continuation-in-part of Ser. No. 849,533 filed Mar. 11, 1992, now U.S. Pat. No. 5,358,343 entitled "Keyboard with Transversely Activated Non-Alphanumeric Keys" issued on Oct. 25, 1994. U.S. Pat. No. 5,358,343 is itself a continuation-in-part of U.S. patent application No. 07/813,289, now abandoned. entitled "Ergonomic Non-Alphanumeric Key Activation" filed on Dec. 19, 1991 which itself is a continuation-in-part of Ser. No. 339,075, filed Apr. 14, 1989, now U.S. Pat. No. 5,143,462 issued on Sep. 1, 1992 entitled "Ergonomically Effective Backspacing Method".

FIELD OF THE INVENTION

This invention relates to cursor activation on keyboards for computers, electronic typewriters, word processors, and the like, and more particularly, to an improved method and apparatus for cursor activation which is easier, more efficient, more ergonomic, and permits the touch typist to activate the cursor comfortably with transverse thumb motion without moving the eyes from the text or moving the hands from their accustomed touch typing position.

DESCRIPTION OF PRIOR ART

The standard electronic and computer keyboards of prior art (See FIG. 1) utilize "arrow", or cursor control keys, 12,14,16,18, which cause a cursor (or perhaps a typing mechanism for electronic typewriters) to move around the screen (or paper for electronic typewriters.) These and other cursor control keys such as 20, 22 are located in positions on the keyboard which force the touch typist to avert his or her eyes from the copy to the keyboard in order to locate and use these keys. Further, the typist must change the hand/finger location(s) and/or stretch uncomfortably to activate these keys.

Still further, the typist must change the hand/finger location from one arrow key to another to move in different directions. Typically, the typist must 1) avert the eyes from the copy to the keyboard,
2) remove the hands from their accustomed location,
3) locate and depress the desired arrow key for movement in one direction,
4) if another directional movement is then required, he or she must then move the hand/finger to the next arrow key for movement in a different direction,
5) step 4) may need to be repeated for other arrow keys,
6) look to the keyboard and return hands to original position, and then
7) search the copy to find the proper location to begin inputting again.

This is not only an inconvenience but a waste of valuable time as well. Further, it adds to typist fatigue which can lead directly to lower efficiency and poorer quality work.

This inconvenience, inefficiency, and fatigue is not only generated by activating the cursor movement arrow keys, but by activating virtually all of the other cursor movement keys such as page up, page down, home and end, as well.

Some keyboard designs more recent than that shown in FIG. 1 (see, for example, Sprague et al, U.S. Pat. No. 4,795,349) have moved the cursor movement keys into different locations, yet none of these designs eliminate the problems and inefficiencies hereinabove delineated. Other prior art (see the "Thumbelina" device of Appoint Corporation) show control of the cursor using a cursor ball which may be operated by the thumbs and which functions much like a mouse. Keyboards including such cursor balls also include cursor movement keys, and the cursor ball is not intended as a surrogate for the cursor keys, but merely as an additional means for moving the cursor. Each of the two types of means has advantages over the other, and each is a separate device unto itself. Cursor keys, for example, provide the user with a way to back or forward space one space at a time or move up or down one line at a time in discrete steps rather than with the continuous movement provided by a mouse or cursor ball. The present invention as applied to cursor movement is intended for use in lieu of either the traditional (discrete movement) cursor keys or the cursor ball, mouse, or other continuous cursor movement control device.

The invention shown by Crews, U.S. Pat. No. 5,017,030, permits somewhat easier motion of the cursor, but entails learning of a new keyboard layout as well as movement of the thumbs which is not as comfortable or as natural nor which interface as well with the spacebar as that provided by the present invention. In addition, the invention of Crews does not include the split spacebar feature shown in the great grandparent patent (U.S. Pat. No. 5,143,462) of the present invention wherein one of the split spacebar sections functions as a backspace/erase key and may be comfortably thumb activated without stretching or moving the hands from touch typing position. Still further, Crew's invention is not suitable to today's common keyboard and is not likely to be embraced by keyboard users or keyboard manufacturers since it entails such a radical departure from that to which users have become accustomed.

Another keyboard design by Outbound in its Laptop System personal computer shows a Track Ball™ located below the center of the spacebar. It may be thumb activated but, as will be shown herein, is not as comfortably or as naturally activated as the present invention. Further, it takes up extra space on the keyboard which may not be necessary with the present invention. Such extra space actually forces the manufacturer to make the keyboard larger, entailing extra expense. It also requires extra space by the user to situate the keyboard. In addition, it moves the cursor in the continuous manner of a mouse or cursor ball rather than the discrete step movements supplied by standard cursor keys and which may be supplied by the improved cursor keys of the present invention. Further, it does not take advantage of the natural tendency of the thumbs to provide activation via transverse motion using direct pressure from the face or tip of a thumb rather than traction force from a side of the thumb.

There is therefore, at present, no comfortable, easy means to activate the cursor (or typing mechanism) movement keys on standard size and design computer or electronic typewriter keyboards without moving the hands from their accustomed touch typing position, stretching of the hands uncomfortably, and/or averting the eyes to look at the keyboard.

OBJECTS AND ADVANTAGES OF THE INVENTION

Accordingly, several objects and advantages of the present novel means for cursor (or typing mechanism) movement are to permit easy, ergonomic, movement of the cursor (or typing mechanism) via thumb movement without having to move the hands to a different location, avert the eyes from the text, stretch uncomfortably, or employ a larger keyboard footprint. This will be less fatiguing on the typist, increase accuracy and efficiency, and provide greater convenience in editing text or figures.

An other object and advantage of the present invention is to provide a means for cursor control which makes use of the strong muscles in the thumbs by permitting the thumb to activate the cursor with pressure from the face or tip of a thumb rather than the edge. The thumb is structured such that its muscles are more suited to apply pressure from the face or the tip rather than the edge.

Yet another object of the invention is to make advantageous use of modern popular and widely used keyboard layouts without necessitating major redesign, re-tooling, or re-learning of touch typing method.

Further objects and advantages of the invention will become apparent from a consideration of the ensuing description of it.

SUMMARY OF THE INVENTION

The invention solves the basic problem of cursor (or typing mechanism) movement associated with prior art keyboards by providing cursor movement keys or other type of actuators within reach of the thumbs that may be comfortably activated by the thumbs without moving the hands from the standard touch typing position. (As used herein, the term "within reach" shall mean within comfortable reach such that the key(s) or other similar actuator(s) be activated without uncomfortable stretching or moving of the hands.) This is done by using key(s) or other type of actuator(s) which are activated by sideways or "transverse" pressure on a side of said key(s) or actuator(s) which may be other than the top face. (The "transverse" direction shall mean any direction other than downwards.) The invention may also be enhanced by incorporating more than one cursor movement function in a single key (or actuator).

The present invention, in one embodiment, comprises a keyboard with four transversely activated cursor control keys (or actuators such as levers) each of which may be activated comfortably by a thumb. Each of the four cursor keys (or actuators) may also have another function associated with it, and typically this other function is activated by downward (rather than transverse) motion or pressure. The four cursor keys comprise:

i) a first key which when depressed may effect a function such as, but not limited to, the alt function and which may be raised such that it has greater height than the spacebar, but also effects a cursor direction such as right cursor when pressed transversely (typically with the thumb face, i.e., the "fingerprint" region of a thumb);

iii) a spacebar under, or within comfortable reach of, at least one thumb which effects a space when depressed, but a cursor direction such as cursor down when pressed transversely (typically with the tip, i.e., the end, of a thumb;

ii) a backspace/erase key under, or within comfortable reach of, a thumb, which effects a backspace/erase when depressed, but also effects a cursor direction such as cursor up when pressed transversely (typically with the tip, i.e., the end, of a thumb;

iv) a fourth key which when depressed may effect a function such as, but not limited to, the alt function and which may be raised such that it has greater height than the spacebar, but also effects a cursor direction such as left cursor when pressed transversely (typically with the thumb face, i.e., the "fingerprint" region of a thumb).

In essence, the present invention utilizes the inventions of the great grandparent and the parent patents in a novel and optimal way.

Other embodiments comprise use of one or more levers or "joy stick" type actuators instead of one or more keys which may be activated via thumb movement. Typically these actuators would be used in lieu of the first and fourth keys described above.

The invention, in its various embodiments, solves the problems associated with prior art in a superior and wholly satisfactory manner.

DETAILED DESCRIPTION OF THE INVENTION

Figure 1:
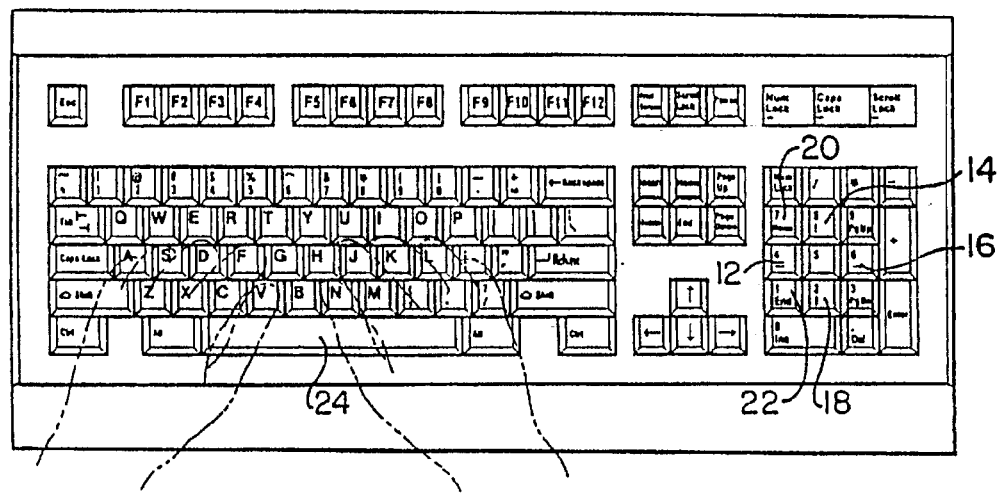
FIG. 1 shows a typist's hands resting in touch typing position on a standard prior art keyboard with typical locations for the cursor movement keys.
Figure 4:
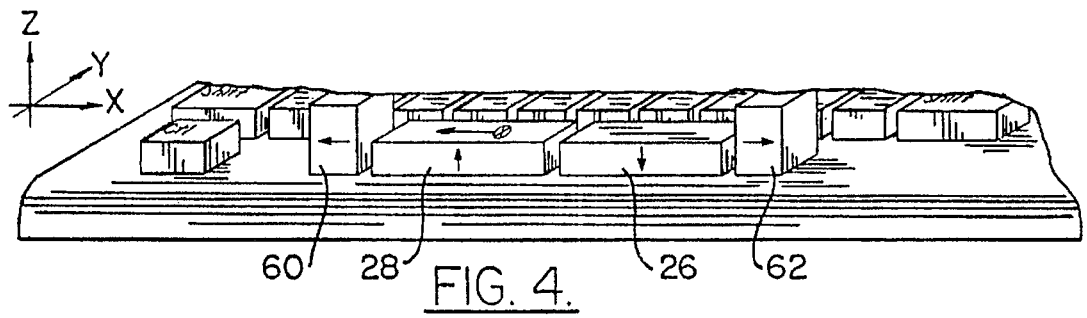
FIG. 4 depicts an embodiment of the present invention.

Previous art keyboards such as that shown in FIG. 1 have not provided a simple, ergonomic, effective means whereby the touch typist could move the cursor around the document being prepared. Cursor movement was not possible without averting the eyes from the copy, moving at least one hand from its accustomed location, and/or unnatural stretching or motion of the hands. Cursor movement keys such as keys 12, 14, 16, 18, 20, and 22 have traditionally been located far from the touch typist's normal hand position. Prior art does not take full advantage of the thumbs by permitting them to do additional jobs beyond that of forward spacing. The present invention, in different embodiments, involves alternative keyboard design(s) which provide ergonomic activation of cursor movement not provided by prior art keyboards FIG. 4 illustrates one embodiment of the invention. Key 28 therein is the thumb activated backspace/erase key shown in the great grandparent patent of the present invention. When depressed, the backspace/erase key simultaneously backspaces and erases a character to the left of the cursor. Key 26 is a spacebar shortened and located so as to accommodate ergonomic placement of the backspace/erase key 28. Keys 60 and 62 activate cursor movement when pressed in a transverse direction and may have other functions, such as the alt function, when activated with downward pressure. Actuators such as levers (i.e. "joysticks") may be used in lieu of keys such as 60 and 62 in any embodiment.

Pushing the front side (the side nearest the typist) of backspace/erase key 28 forward (i.e., in the direction away from the typist in the positive "Y" direction as shown in FIG. 4) causes the cursor to move upward. Pushing the front side (the side nearest the typist) of the spacebar key 26 forward (i.e., in the direction away from the typist in the positive "Y" direction as shown in FIG. 4) causes the cursor to move downward. Pressing key 60 leftward (i.e., in the negative "X" direction) causes the cursor to move leftward. Pressing key 62 rightward (i.e., in the positive "X" direction) causes the cursor to move rightward.

With the hands and fingers in touch typing position, the up and down cursor movements may be effected comfortably by pushing on the front faces of the backspace/erase key 28 and the spacebar 26 with a thumb tip (i.e., the end region furthermost from the point of attachment of the thumb to the hand) of either the left or right thumb. The left and right cursor movements may be effected comfortably without moving hands and fingers from touch typing position by pushing on the sides of keys 60 and 62 with the thumb face (i.e., the region of the thumb which is used for fingerprinting and which is on the opposite surface of the thumb from the thumbnail). This type of motion and this type of applied pressure is most natural to the thumbs because it utilizes the particular motions for which the thumb evolved over time to be most used. The muscles in the thumb used for such motions are much stronger than those used typically in typing for spacebar activation wherein the edge of the thumb is used. Hence the present invention is decidedly ergonomic.

Key 60 is typically located to the left of the left thumb of the touch typist when the hands and fingers are in touch typing position. Key 62 is typically located to the right of the right thumb of the typist. Key 28 is typically located at least in part underneath, or at least close, to the left thumb. Key 26 is typically located at least in part underneath, or at least close, to the right thumb.

In the preferred embodiment, key 28 effects a backspace/erase function when depressed (in the negative "Z" direction) and a cursor up function when pushed forward (in the "Y" direction). Key 16 effects a space function when depressed (in the negative "Z" direction) and a cursor down function when pushed forward (in the "Y" direction). Key (or other actuator) 60 may effect a function such as alt when depressed (in the negative "Z" direction) and a cursor left function when pushed leftward (in the negative "X" direction). Key (or other actuator) 62 may effect a function such as alt when depressed (in the negative "Z" direction) and a cursor right function when pushed rightward (in the positive "X" direction).

However, the invention is not limited by such specific function allocations, and many other such allocations are comprised within the scope of the invention. For example, key 60 may not effect any function when depressed. Or it may effect another cursor function such as home (or end or page up or page down) when depressed. Or it may effect some other function such as control. The same possibilities apply to key 62 as well. Further, either or both of keys 60 and 62 could have yet another function (cursor control or other) which is effected when pressure is applied on the front face (in the "Y" direction) of said key(s). Keys 26 and 28 may also have other functions assigned for pressure in either the downward or transverse directions. For example, key 28 may be a spacebar and key 26 may be a backspace/erase key. Or both 26 and 28 keys may be spacebars. Or either could have yet some other function when depressed or activated transversely. Any key within comfortable reach of a thumb, for example, may function as a control key, either when depressed or activated transversely. A control key which is within comfortable reach of a thumb with the hands and fingers in touch typing position might only function by depression and not be either a cursor key or a transversely activated key and may even be on an other keyboard which does not have transverse thumb activation at all.

The invention comprises any keyboard on which touch typing may be done and on which each alphanumeric character is effected by a separate key wherein four transversely activated cursor control keys may be actuated comfortably by the thumbs without moving the hands and fingers from touch typing position. In a preferred embodiment, each of two of the cursor control keys is activated by pushing with the face of a thumb on a side of said key, and each of the other two cursor control keys is activated by pushing with the tip (end) of a thumb on the front side of each of said other keys. Each of the four transversely activated cursor keys may have an other function when depressed.

In the popular QWERT key arrangement either of two of the four transversely activated cursor control keys may be located adjacent any one or more of the c,v,b,n,m, comma, or period keys. Either of two others may be located adjacent any one or more of the z, x or c keys or any one or more of the m, comma, period or question mark keys. Either of the two outermost (furthest to the touch typist's right or left, i.e., in the positive or negative directions as shown in FIG. 4) cursor control keys may be adjacent either of the other two cursor control keys as well. If two of the cursor control keys are bars (such as a spacebar or a bar used to backspace/erase) either (or both) of the two outermost keys may be adjacent the end (the shorter dimension side of the rectangular bar) of one of the bars. (As used herein the term "end" as applied to a bar shall mean the shorter dimension side; the term "edge" as applied to a bar shall mean the longer dimension side.)

The transversely activated cursor control keys are located within reach of the thumbs of a touch typist when the typist's hands and fingers are in touch typing position. (As used herein, the term "within reach" shall mean within comfortable reach such that the key(s) or other similar actuator(s) be activated without uncomfortable stretching of the hands or fingers, including the thumbs or moving of the entire hand.) The locations of any of these cursor control keys may be, at least in part, in the same row as a spacebar.

Activation of keys or other actuators such as levers or "joy sticks" in all embodiments may be accomplished by such means as that employed on typical keyboards or with electronic games. These may be switches or contact elements or pads, or any means such as those normally used on keyboards or any other means. Such activation means are both well known and trivial to those skilled in the art. The invention is not limited by the type of activation employed, but encompasses all possible means for key or other actuator activation.

Keys such as 60 and 62 (shown in FIG. 4) or others in other embodiments which serve similar purposes may be "raised" keys such that their height is greater than that of other keys (such as, but not limited to, the spacebar) in close proximity. Alternatively, keys such as 60 and 62 may be normal height with one or more other keys (such as the spacebar key) in their vicinity lowered in height.

Figure 7:
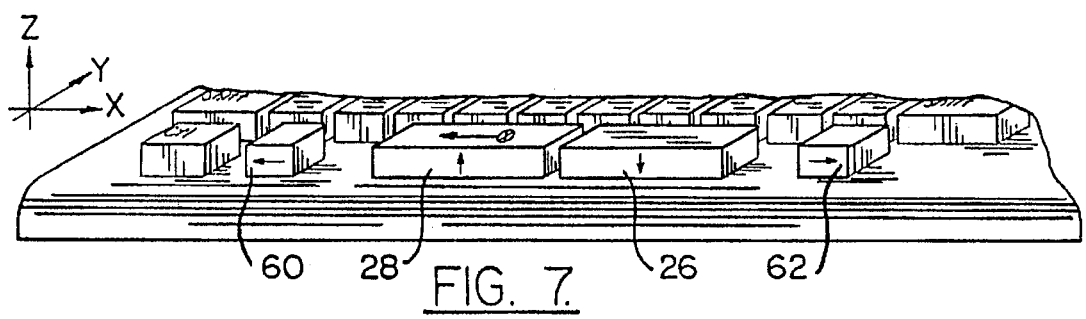
FIG. 7 shows another embodiment of the present invention.

In yet another configuration shown in FIG. 7, there may be a region (space) without keys or other significant structure between key 28 and key 60 and a similar region between key 26 and key 62 such that each of keys 60 and 62 may be readily activated by transverse pressure on the side closest to the face of the touch typist's thumb (i.e. leftward pressure on the right side of key 60 and rightward pressure on the left side of key 62). Each region is wide enough such that the touch typist's left thumb may fit between key 28 and 60 and the right thumb may fit between key 26 and key 62. Each of these regions therefore has a width (e.g., the distance between key 28 and key 60) of at least one standard key width (i.e., of at least half of an inch). Keys 60 and 62 may then be normal height, such as that of other keys, but because of the regions without keys they could be activated readily by transverse pressure. Either, or both, of keys 60 and 62 may also effect an other function such as, but not limited to, alt when depressed.

It should be noted that with keys 60,62 raised as shown in FIG. 4, they occupy a spatial region above the standard keyboard which is typically not intersected by the hands, or any part of the hands including the fingers and thumbs, during normal usage by a touch typist. This is an advantage of the present invention in that additional commonly used keys may be placed within comfortable access of the touch typist in such a way that they occupy a region of space which heretofore has not been considered by prior art. No change in methodology of typing is required by the typist, nor is any major re-design of the keyboard. Yet a valuable feature is added which can aid the touch typist considerably.

Keys such as 60 and 62 may in alternative variations of the invention be normal height and yet have spaces between them and other keys such that one or more of their functions may be activated by sideways motion. Such sideways motion may be forward (positive "Y"), back (negative "Y"), left (negative "X"), right (positive "X"), or some combination of those directions.

Keys such as 60 and 62 may have additional cursor control functions such as "home" and "end" incorporated. In one application the home and end functions are activated by depression of keys 60 and 62 respectively. The functions of home and end could obviously be reversed as well such that they are activated by depressing 62 and 60 respectively. Any possible directional pressure may be applied on either of the keys 60 and 62 to effect any cursor control function. The labeling shown in FIG. 4 represents therefore only one possible set of ways for which activation of these functions is possible.

Each of the transversely activated cursor keys (or actuators) may have other functions when activated simultaneously with, or sequentially after, an other key such as the alt, control, or shift key.

The use of levers described hereinabove may be applied to use of keys and vice versa. Any other actuator which can effect the same result as a key or lever may be substituted in any embodiment, whether implied or expressed, of the invention.

ACTUATOR STRUCTURE

The electromechanical means for activating each function, i.e., the "switching" or other means, for sending the appropriate signal to the computer when a given actuator is activated is not relevant to the working of the invention. Such means are common, and are both trivial and well known to those skilled in the art. The present invention involves novel placement and application of transverse directional pressure of said actuators and comprises any appropriate electromechanical means for activation.

Figure 5:
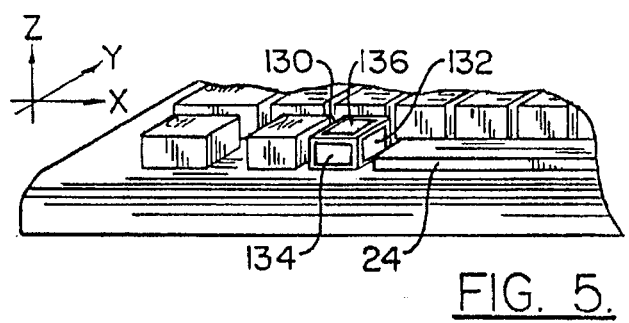
FIG. 5 illustrates one of many possible key structural designs which are comprised by the present invention.

Transverse pressure application is exceedingly commonplace for activation of "joy stick" or lever actuators. While transversely activated keys are less common, means for electromechanical activation for such keys would be obvious to those skilled in the art. Many such designs are possible. FIGS. 5 and 6 illustrate two particular means for multiple directional pressure activation of keys.

FIG. 5 shows a raised key with capability for activation on three faces: the front face (facing the negative "Y" direction with pressure to be applied in the positive "Y" direction), the right face (facing positive "X", pressure applied in negative "X" direction), and the top face (pressure applied downward in negative "Z" direction.) In this configuration, the key housing 130 itself does not move. Located on each face is a simple pressure switch which closes the appropriate circuit when depressed by bringing two internal contacts (not shown) together. Such switches are well known and may be implemented straightforwardly by those skilled in the art. The "X" face has switch element 132; the "Y" face, switch element 134; and the "Z" face, switch element 136. Switch 132 may be located above the spacebar 24 as shown. The appropriate circuit to be closed may be the same as those already found on innumerable prior art keyboards and which are used to effect activation of the appropriate function. Designs which provide activation on more or less faces than three, for more or less functions than three, are obvious variations on the configuration of FIG. 5, merely requiring more or fewer switches.

Figure 6A:
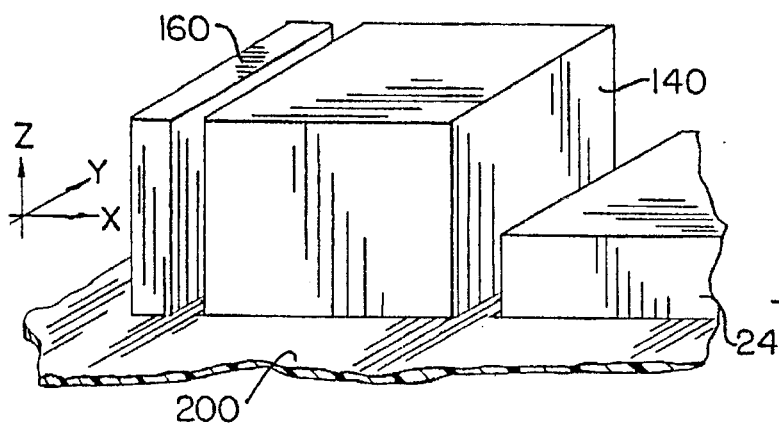
FIG. 6 illustrates another one of many possible key structural designs which are comprised by the present invention.
Figure 6B:
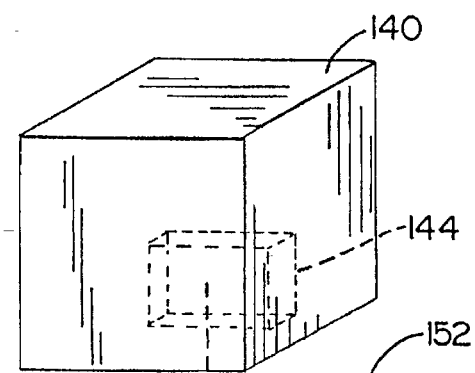
Figure 6C:
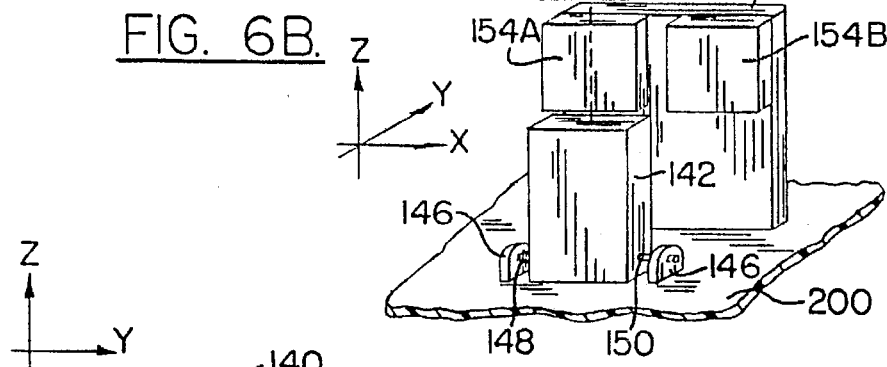
Figure 6C:
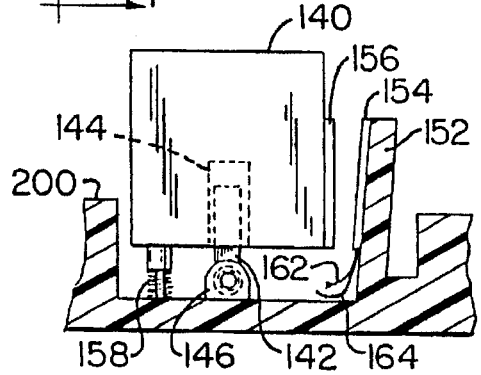
Figure 6D:
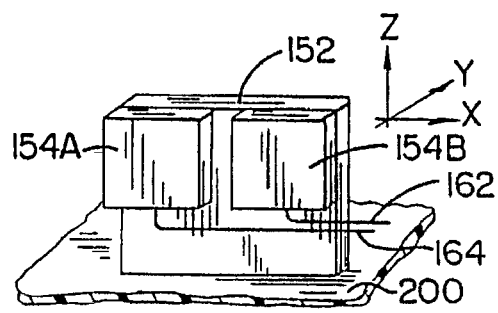

FIGS. 6A, 6B, 6C, and 6D show a second possible means for activation of functions by pressures other than downwards. FIG. 6A shows key housing 140, spacebar or backspace/erase key 24, and rigid element 160 extending from keyboard frame 200. In FIG. 6B, key housing 140 is cut away to reveal positioning element 142 along which the key housing 140 slides without resistance in the vertical ("Z") and left/right ("X") directions. Positioning element 142 pivots on rod 150 which rides in the holes of support elements 146. Support elements 146 are rigidly attached to keyboard frame 200. Torsional spring 148 is attached on one end to rod 150 and on the other end to keyboard frame 200. Conducting elements 154 and 156 are the two sides of a switch which closes when key housing 140 pivots forward via rod 150 allowing elements 154 and 156 to come into contact. 154 may be composed of two parts, 154a and 154b (see FIG. 6D), attached to rigid element 152 which in turn is attached to keyboard frame 140. Circuit lead wires 162 and 164 are attached to each of 154a and 154b. Element 156 is one solid conducting piece extending in the "X" direction from the rightmost side (as shown in FIG. 6D) of element 154b to the leftmost side of element 154a. When pressure is applied to the housing 140 in the forward ("Y") direction, element 156 comes into contact with both sides of element 154, thereby completing the appropriate circuit linked through leads 162 and 164 and permitting a specific function related to that circuit to be activated. The circuitry employed may be the same as that of any of the many prior devices well known to those familiar with keyboard art.

Leftward pressure (negative "X" direction) on the housing 140 may be resisted by a spring loaded switch (hidden and not shown in FIGS. 6A to 6D) mounted between housing 140 and rigid element 160. Rigid element 160 is attached to the keyboard frame 200. This switch does not resist motion in any direction other than leftward and save for its spring may be similar in construction to that shown in FIG. 6C or of any suitable prior art type. Key housing 140 slides without resistance in the slot within it along positioning element 142. The spring loaded switch between elements 160 and 140 provides resistance to negative "X" direction motion and also provides the contact connection for a second circuit which effects activation of another function. The spring may be typical of most springs in that it resists motion only along one axis (the "X" axis here.) Alternatively, the switch for "X" direction activation may be structurally similar to that of element 154 and 156 for "Y" direction activation shown in FIGS. 6B, 6C, and 6D. In that configuration, a uni-directional spring may be used between elements 140 and 160 which resists motion only in the "X" direction.

Downward (negative "Z" direction) pressure is resisted by a third spring loaded type switch (shown in FIG. 6C but not shown in FIG. 6B) such as those currently used in present day keyboards. As with most springs, this spring does not resist motion in any direction except one (the "Z" direction here.) This third switch may activate yet another function in the same manner as the other two switches activate their respective functions. Alternatively, the "Z" direction switch could be structured in the manner of the "Y" direction switch shown in FIGS. 14A to 14D. A conducting strip on the key housing 140 similar to 156 could then contact two separate strips on the frame 200 when the key housing 140 is depressed. Each of these separate strips would have leads permitting closing of the appropriate circuit and resulting in activation of the desired function via standard prior art keyboard circuit technology. A "Z" direction spring with no appreciable resistance in the "Y" and "X" directions may be employed.

Elimination of the capability of activating a function in any one of the three directions shown in FIGS. 6A to 6D to provide a key which activates in only two directions, or only one direction, is a trivial modification of the structure shown.

ADVANTAGES OVER PRIOR ART

This invention can thus be seen to solve all of the problems delineated in the "Description of Prior Art" section presently associated with non-alphanumeric key activation in a simple and novel manner.

While the above description contains many specificities, the reader should not construe these as limitations on the scope of the invention, but merely as exemplifications of preferred embodiments thereof. Those skilled in the art will envision many other possibilities that are within its scope. For example any of the embodiments may use any shape or dimensions for the actuators which may be located in many different locations. The actuators and the keyboard may be of any material, size, and shape, so long as said keyboard is an alphanumeric keyboard such as those which may be used by touch typists.

Figure 2:
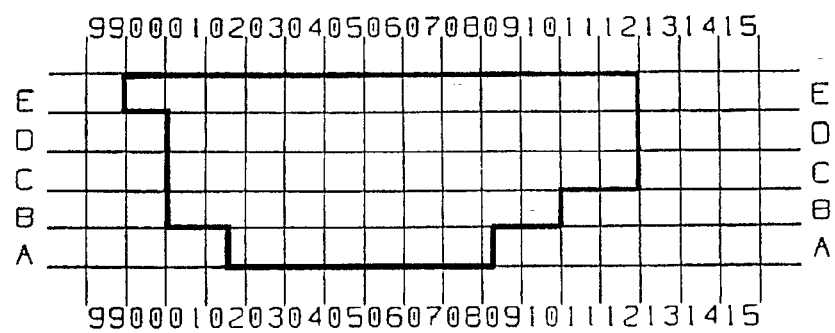
FIG. 2 shows the prior art keyboard grid numbering scheme figure published by the International Organization for Standardization wherein each column is designated by a two digit number and each row by a letter.
Figure 3:
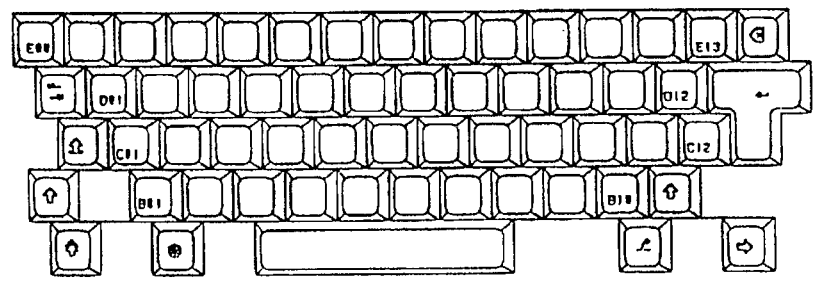
FIG. 3 shows another diagram of the prior art keyboard grid numbering scheme figure published by the International Organization for Standardization wherein each column is designated by a two digit number and each row by a letter.

In the standard keyboard for which the ISO standards are being formulated by the International Organization for Standardization the rows and columns are designated via a grid (see FIGS. 2 and 3) in which two digit numbers are used for columns and letters are used for rows. The spacebar in a standard keyboard version being considered for the ISO standards is located in the A row from columns 03 to 07, i.e., from A03 to A07. The present invention is not limited to the standard keyboard addressed by the ISO standards keyboard as referenced by FIGS. 2 and 3. However, in keyboards wherein the alphanumeric keys are arranged according to a proposed or eventually accepted ISO standard, the cursor control key(s) or other actuator(s) which may be transversely activated according to the present invention may be located anywhere in whole or in part on the A row within comfortable reach of one or two thumbs. Typically, such cursor actuator location(s) according to the present invention may be anywhere, in whole or in part, within the region A03 to A07, i.e., the location of the standard spacebar in conventional (ISO standard) keyboards. One or more may also be located anywhere else partially intersecting or entirely contained within the A row as well as anywhere below the A row (nearer the typist than the A row). Typically, such transversely activated actuators may be situated, in whole or in part, between columns 01 and 12. For example, in FIG. 4 key 28 may extend, at least in part, over regions A03, A04, and/or A05. It may even extend over A02 and/or A06. In principle, the spacebar 26 or the backspace/erase key 28 may be shortened or moved somewhat in order to accommodate the transversely activated actuators described herein in any suitable configuration. Typically, it may be preferred to locate such actuators within comfortable reach of the thumbs of a touch typist having hands located in touch typing position. In ISO standards type keyboards, this may in whole or in part intersect the A row, or the row under the A row which, for present purposes, may be designated row AA. Embodiments with keys (actuators) partially or wholly intersecting row AA may then have transversely activated cursor control keys (actuators) located partially or wholly intersecting columns anywhere between AA01 and AA12. The transversely activated cursor control keys (actuators) shown herein may be located in whole or in part in an other row of a keyboard having alphanumeric keys conforming to the ISO standards keyboard such as row B. As used herein the term "ISO standards" or "international standards" shall refer to ISO (international) standards proposed as of the date of filing of the present application or to ISO (international) standards which are eventually accepted.

Further, the invention comprises any transversely activated actuator(s) effecting cursor control functions which are adjacent to or within one row of the spacebar.

The words pressure or force when used herein as applied to a key, lever, or other type of actuator may also be interpreted as movement or touch. Also, for a given function, pressure may be applied in any direction and is not restricted to right, left, forward, backward, and down directions. As an example, leftward cursor movement may be effected by a pressure which is directed half way between the left (negative "X"direction) and the forward ("Y" direction) directions at a 45° angle to both.

Further, a transversely activated key (or lever or other type of actuator) may also function as an alphanumeric key.

Although the figures herein show key layouts in which all alphanumeric keys are contiguous, the invention is not restricted to such layouts. For example, the invention comprises split keyboards in which the key layout is split into two or more separate sections. In many of these layouts, the keys reached by each of the left and right hands during touch typing are in two separate contiguous blocks of keys which are separated by space between the two blocks.

The terms "key", "lever", and "joy stick" are not restrictive and any mechanism or other actuator means which effects the same or similar effect may be used in any embodiment of the invention. Any shape, size, or material for said elements is likewise comprised by the invention. Further, any keyboard utilizing the invention may be programmable or changeable by means of switching or otherwise such that the function(s) performed by any one of the actuators shown in this invention may be changed to suit the desire of the typist. Accordingly, the scope of the invention should be determined not by the embodiments described, but by the appended claims and their legal equivalents.

We claim:

1. A keyboard for a computer, electronic typewriter, word processor, and the like comprising:

a plurality of alphanumeric keys comprising at least twenty-six alphanumeric keys and ten numeric keys arranged corresponding to touch typing position each of which alphanumeric keys automatically types a different alphanumeric character in response to downward actuation thereof, four cursor control actuators actuable transversely, each cursor control actuator having means for automatically effecting cursor movement in a direction different from each other cursor control actuator in response to actuation in a direction other than downward, the first of said cursor control actuators being within reach and located left of the left thumb of a touch typist having hands and fingers in touch typing position, the second of said cursor control actuators being located within reach of the left thumb of the touch typist having hands and fingers in touch typing position, the third of said cursor control actuators being located within reach of the right thumb of the touch typist having hands and fingers in touch typing position, and the fourth of said cursor control actuators being within reach and located right of the right thumb of the touch typist having hands and fingers in touch typing position, each of said four cursor control actuators comprising a separate key of said keyboard.

2. The keyboard of claim 1 wherein at least one of the second and third cursor control actuators comprises an elongated key, said at least one second and third cursor control actuators is located at least in part underneath at least one thumb of the touch typist, and said at least one second and third cursor control actuators comprises a means for automatically providing a space in response to downward depression thereof.

3. The keyboard of claim 1 wherein at least one of the second and third cursor control actuators comprises an elongated key, said at least one second and third cursor control actuators is located at least in part underneath at least one thumb of the touch typist, and said at least one second and third cursor control actuators comprises a means for automatically backspacing and erasing a character in response to downward depression thereof.

4. The keyboard of claim 1 wherein the second cursor control actuator comprises an elongated key, said second cursor control actuator further comprises means for automatically backspacing and erasing a character in response to downward depression thereof, the third cursor control actuator comprises an elongated key, and said third cursor control actuator further comprises means for automatically providing a space in response to downward depression thereof.

5. The keyboard of claim 4 wherein the second cursor control actuator is located, at least in part, underneath at least part of one thumb of the typist having hands and fingers in touch typing position, and the third cursor control actuator is located, at least in part, underneath the other thumb.

6. The keyboard of claim 4 wherein the first cursor control actuator comprises a means for automatically moving a cursor leftward in response to transverse actuation of said actuator thereof, and the fourth cursor control actuator comprises a means for automatically moving the cursor rightward in response to transverse actuation of said actuator thereof.

7. The keyboard of claim 4 wherein the first cursor control actuator comprises a means for automatically moving a cursor leftward in response to leftward transverse actuation of said actuator thereof, and the fourth cursor control actuator comprises a means for automatically moving the cursor rightward in response to rightward transverse actuation of said actuator thereof.

8. The keyboard of claim 7 wherein at least one of the first and fourth cursor control actuators further comprises means for effecting an alt function in response to downward depression thereof.

9. The keyboard of claim 7 wherein at least one of the first and fourth cursor control actuators has greater height than the spacebar.

10. The keyboard of claim 1 further comprising a region devoid of any key located between the second cursor control actuator and the first cursor control actuator wherein the distance between the second cursor control actuator and the first cursor control actuator is at least half of an inch.

11. The keyboard of claim 1 wherein at least one of the second and third cursor control actuators comprises an elongated key, said at least one of the second and third cursor control actuators is located at least in part underneath at least one thumb of the touch typist, and said at least one of the second and third cursor control actuators comprises means to provide a space in response to downward depression thereof, and wherein one of the second and third cursor control actuators comprises means to move the cursor up in response to forward direction pressure away from the touch typist on a front side of said actuator thereof, and the other of the second and third cursor control actuators comprises means to move the cursor down in response to forward direction pressure away from the touch typist on a front side of said actuator thereof.

12. The keyboard of claim 11 wherein the first cursor control actuator comprises a means for moving the cursor leftward in response to leftward pressure on said first actuator thereof, and the fourth cursor control actuator comprises means for moving the cursor rightward in response to rightward pressure on said fourth actuator thereof.

13. The keyboard of claim 1 wherein the alphanumeric keys are arranged according to ISO standards row and column designations and each of the four transversely actuable cursor control actuators is located, at least in part, in row A.

14. The keyboard of claim 1 wherein the alphanumeric keys are arranged according to ISO standards row and column designations, each of the four transversely actuable cursor control actuators is located, at least in part, in row A, the first said actuator is located, at least in part, in one of columns 01, 02 and 03, the second said actuator is located, at least in part, in one of columns 03, 04 and 05, the third said actuator is located, at least in part, in one of columns 05, 06, 07, and 08, and the fourth said actuator is located, at least in part, in one of columns 07, 08, 09 and 10.

15. The keyboard of claim 1 wherein at least one of the first and fourth cursor control actuators further comprises means for automatically effecting an alt function in response to actuation thereof, and at least one of the second and third cursor control actuators further comprises means for automatically providing a space in response to actuation thereof.

* * * * *